United States Patent [19]

Crowther

[11] Patent Number: 5,209,969
[45] Date of Patent: May 11, 1993

[54] CARBAMATE/URETHANE COMPOSITION AND TEXTILE LAMINATION PROCESS

[75] Inventor: Glenn W. Crowther, Newark, Del.

[73] Assignee: W. L. Gore & Associates, Inc., Newark, Del.

[21] Appl. No.: 832,258

[22] Filed: Feb. 7, 1992

[51] Int. Cl.⁵ .............................................. C08G 18/10
[52] U.S. Cl. ................................ 428/317.5; 524/728; 428/423.1; 428/422; 528/61; 521/159
[58] Field of Search ..................... 524/728; 428/423.1, 428/422, 317.5

[56] References Cited

U.S. PATENT DOCUMENTS 3,635,908  1/1972  Vogt et al. ............................ 521/159
4,532,316  7/1985  Henn ..................................... 528/59

FOREIGN PATENT DOCUMENTS 203547  11/1978  Czechoslovakia .
203548  11/1978  Czechoslovakia .
203381   5/1979  Czechoslovakia .
205967   8/1980  Czechoslovakia .
1493242  5/1975  United Kingdom .

Primary Examiner—Maurice J. Welsh
Assistant Examiner—Rachel Johnson
Attorney, Agent, or Firm—Gary A. Samuels

[57] ABSTRACT

A storage stable adhesive mixture of hexamethylenediamine carbamate and the reaction product of ethylene/propylene oxide polyol and a polyurethane prepolymer of diphenyl methane diisocyanate, polytetramethylene glycol, and optionally, 1,4-butanediol; and a process for using the adhesive to laminate fabric to polymeric membrane is also described.

3 Claims, No Drawings

CARBAMATE/URETHANE COMPOSITION AND TEXTILE LAMINATION PROCESS

FIELD OF THE INVENTION

This invention relates to a novel procedure for laminating flexible textile materials, and to a composition capable of adhering the textile materials to each other.

BACKGROUND OF THE INVENTION

Storage stable, solvent-free fast curing adhesive compositions have long been sought for use in laminating textile materials together.

Certain polyether polyurethane prepolymers, such as those described in Henn U.S. Pat. No. 4,532,316, have been found useful as adhesives. Room temperature moisture curing by heating under humid conditions is relatively slow and these prepolymers do not lend themselves well to an on-line laminating procedure which produces finished final products immediately. Moreover, many of these prepolymers are not "breathable", i.e. do not pass water vapor (moisture hereinafter) in any applicable quantities through their mass and are not suitable for use where the laminated textiles are designed to "breathe" for wearer comfort.

These disadvantages are overcome by the novel adhesive compositions of this invention, and by the process of this invention which is preferably carried out in an on-line lamination sequence.

SUMMARY OF THE INVENTION

The composition of this invention is
a storage stable adhesive mixture of
A) hexamethylenediamine carbamate, and
B) the reaction product of
   (i) ethylene/propylene oxide polyol, and
   (ii) a polyurethane prepolymer of
      (i) diphenyl methane diisocyanate
      (ii) polytetramethylene glycol, and, optionally,
      (iii) 1,4-butanediol The process of the invention is a process for laminating a fabric to a polymeric membrane, which comprises
1. applying the storage stable adhesive mixture to a fabric,
2. causing the membrane to be placed against the fabric on the side the mixture is on,
3. heating the combination at 150°-180° C. whereby the heat causes the carbamate to decompose forming hexamethylenediamine and releasing $CO_2$, which causes foaming and forces the composition to spread, and which causes the hexamethylenediamine to react with —NCO groups of the prepolymer thus curing the prepolymer.

DESCRIPTION OF THE INVENTION

To make the adhesive composition of the invention, hexamethylene diamine (HMD) and ethylene/propylene oxide polyol (E/P polyol) are mixed together under an inert atmosphere, such as nitrogen. The ingredients should be substantially free of moisture (water). The amounts used should be such as to result in 20–50% by weight HMD and complementally 80–50% by weight E/P polyol. Carbon dioxide is passed through the mixture at a temperature between 45° and 50° C. to obtain a 20 to 45 weight % solids content of the HMD carbamate in the E/P polyol.

The E/P polyol can be either a block or a random mixture of oxyethylene and oxypropylene units with hydroxyl groups on the ends. The E/P polyol used herein was obtained from Olin Corporation. The HMD was obtained from the DuPont Company.

The resulting dispersion of HMD carbamate in the polyol is then mixed with the polyurethane prepolymer in amounts of 10–30 weight % HMD mixture and 90–70 weight % prepolymer at a temperature range of 20° to 25° C.

The polyurethane prepolymer used is a reaction product of 3 to 5 equivalents of diphenylmethane diisocyanate, 1 to 3 equivalents of polytetramethylene glycol, and, optionally, 0.1 to 0.6 equivalents of 1,4-butanediol. The prepolymer can be prepared as described in Henn U.S. Pat. No. 4,532,316.

The polyurethane prepolymer is believed to be represented by the formula

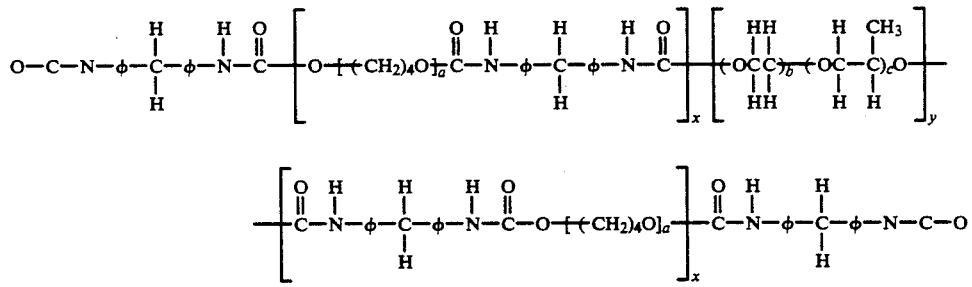

wherein:
x = 0 to 10
y ≧ 0
a = 1 to 40
b = 15 to 50
c = 1 to 15
$\phi = $ —$C_6H_4$—

On blending with the E/P polyol, the hydroxyl groups of the polyol react with the OCN groups of the polyurethane prepolymer to result in an admixture of a long chain polyurethane having NCO end groups and HMD carbamate solids in amounts of between about 1–10 wt. percent. The long chain polyurethane can be solid or liquid depending on the amount of butanediol present.

The resulting novel adhesive composition is storage stable, i.e. it does not gradually increase in viscosity as it stands since the amine groups of the HMD are blocked. Thus, the composition can be stored until it is ready for use. In use, the composition can be applied to a substrate, preferably a textile material or a porous polymeric membrane and another textile material placed next to the composition. Lamination can then be achieved simply by heating the composition until the HMD carbamate decomposes to HMD and $CO_2$. The —$NH_2$ end groups of the HMD instantly react with the—NCO groups of the long chain polyurethane and thus cures the long chain polymer.

The procedure is especially useful where a breathable, i.e. moisture (water vapor) permeable, liquid water-proof membrane is bonded to a textile backing such as a woven or knit material. The adhesive composition is not highly breathable; and thus, to maintain the breathable qualities of the breathable fabric, the adhesive is applied in a gravure dot fashion so that not all the fabric is covered by the adhesive. When the HMD carbamate decomposes, the resulting rapid release of $CO_2$ causes a temporary foaming which forces the adhesive composition into the fabric and effects good adhesion.

The adhesive is especially effective for laminating delicate moisture permeable, waterproof membranes, such as expanded microporous polytetrafluoroethylene membranes described in Gore U.S. Pat. No. 4,187,390.

Use of the compositions of the invention results in a much faster cure of the adhesive than many of the solvent-free polyurethane prepolymer adhesives taught by the prior art, such as Henn U.S. Pat. No. 4,532,316 which cure by reaction with water or water vapor. Use of the compositions also results in fabric laminates having a better "hand" because the lay down quantity of the composition is lessened due to the spreading of the adhesive into the fabric caused by release of the $CO_2$. Better adhesion is also attained, again, due to the release of the $CO_2$ because the force of the $CO_2$ release forces the adhesive partially into the interstices of the woven or knit fabrics.

Finally, because the cure of the adhesive composition is a rapid one, the composition is especially useful to laminate a stretchable textile material, such as a knit, in stretched condition to an unstretched breathable, liquid water impermeable membrane. After lamination, tension on the stretched fabric is removed and it contracts, resulting in a laminate that can be stretched, even though the membrane is not, per se, stretchable.

EXAMPLES

Example 1

A paste was prepared by adding 100-gm hexamethylenediamine (HMD) to 244-gm ethylene/propylene oxide polyol (E/P polyol) by pouring the HMD into the EP polyol at 45° C. and ambient room pressure, bubbling $CO_2$ through the mixture to obtain a 35% solids dispersion, and monitoring the drop in free HMD content by titration until all the HMD was converted to HMD carbamate whereupon the reaction was stopped.

Then 31 g of the paste was added at room temperature to 126 g of a polyurethane polymer that is the reaction product of 43 g diphenyl methane diisocyanate and 83 g polytetramethylene glycol. The resulting mixture was a liquid containing 7% HMD carbamate.

Example 2

A paste was made as in Example 1.

27.5 g of the paste was added at room temperature to 126.8 g of a prepolymer that is the reaction product of 43 g diphenyl methane diisocyanate, 83 g polytetramethylene glycol and 0.8 g butanediol. The resulting composition was a semi-solid containing 6% HMD carbamate.

Example 3

A paste was made as in Example 1. 24.3 g of the paste was added at room temperature to 127.5 g of a prepolymer that is the reaction product of 43 diphenyl methane diisocyanate, 83 g polytetramethylene glycol and 1.5 g butanediol. The resulting composition was a solid containing 5% HMD carbamate.

EXAMPLE 4

A coated textile was prepared by preheating the adhesive composition prepared in Example 1 to 50° C. and applying it to a film of porous, expanded polytetrafluoroethylene in dot fashion using a gravure dot roll heated at 50° C. A textile fabric, specifically a polyester (Pongee ® US 101) fabric, was then applied by feeding it along a moving belt of the film and pressing the fabric between two rolls (one heated to at least 160° C., and preferably between 160° C. and 180° C. depending on the dwell time in contact with the hot roll: one unheated) so that the fabric is against the adhesive bearing side of the film as it passes between the two rolls. This decomposes the HMD carbamate and effects curing of the long chain polyurethane.

In a similar manner the compositions of Examples 2 and 3 were used to laminate textile fabrics.

I claim:

1. Process for laminating a fabric to a polymeric membrane, which comprises
   A) applying a storage stable adhesive mixture of
      a) hexamethylenediamine carbamate, and
      b) the reaction product of
         i) ethylene/propylene oxide polyol, and
         ii) a polyurethane prepolymer of
            a) diphenyl methane diisocyanate
            b) polytetramethylene glycol, and optionally,
            c) 1,4-butanediol
      to a fabric,
   B) causing the membrane to be placed against the fabric on the side the mixture is on,
   C) heating the resulting combination at 150°-180° C. whereby the heat causes the carbamate to decompose forming hexamethylenediamine and releasing $CO_2$ which causes foaming and forces the composition to spread, and which causes the hexamethylenediamine to react with —NCO groups of said reaction product.

2. The process of claim 1 wherein the polymeric membrane is expanded microporous polytetrafluoroethylene.

3. The process of claim 2 wherein the fabric is a lint fabric held in a stretched condition during steps B and C.

* * * * *